United States Patent Office 2,890,984
Patented June 16, 1959

2,890,984

PHARMACEUTICAL COMPOSITION CONTAINING 2-(1,2,3,4-TETRAHYDRO-1-NAPHTHYL)IMIDAZOLINE

Melville Sahyun, Santa Barbara, Calif., assignor to Chas. Pfizer & Co., Inc., New York, N.Y., a corporation of Delaware No Drawing. Application August 4, 1955
Serial No. 526,555

1 Claim. (Cl. 167—65)

This invention is concerned with a novel process for bringing about hypnosis or sedation in humans or other animals and with compositions particularly useful for this purpose.

The present invention is concerned with the process of administering the compound 2-(1,2,3,4-tetrahydro-1-naphthyl)-imidazoline (hereinafter referred to as tetrahydrozoline) particularly by the oral route. Certain substances closely related to tetrahydrozoline, such as its acid addition salts, are also highly useful for the present process and compositions. This invention is also concerned with various pharmaceutically-acceptable dosage forms of tetrahydrozoline and the related compounds, which dosage forms are especially useful for administration by the oral route.

Tetrahydrozoline has been known previously in the form of aqueous solutions, particularly of the hydrochloride, which is useful as a nasal decongestant. It is highly effective for this use. It has now been found that the compound has a non-analgous use as a sedative agent, hypnotic or somnifacient. The compound may most readily be administered as solid dosage forms, that is, as tablets, troches, lozenges, capsules and so forth. These may be prepared with various excipients, coatings, sweetening agents, coloring agents, and flavoring agents which are generally accepted in the practice of pharmaceutical manufacture. The process of preparing these solid dosage forms follows accepted practices in the industry.

The amount of active material required to bring about sedation or sleep in an animal, such as a human, is very limited. For instance, sleep has been induced in an adult man by orally administering as little as 0.75 milligram of the active compound, tetrahydrozoline hydrochloride. Individual patients may vary somewhat in their response. In human infants, a dosage of 0.005 milligram per pound of body weight has resulted in sleep within a short time. It should be noted that a much higher dosage may be required in the case of lower animals and, in some cases, the present products may have a rather limited activity in individual species. The high order of activity in humans is noteworthy. The compositions are of very definite value in bringing about sedation in excited patients; for instance, patients that are mentally ill or in pre-operative treatment to assure easy administration of anesthesia. The oral administration of the compositions is also of value for treatment of hypertension. Other comparable or related uses will suggest themselves to those skilled in clinical medicine. Care must be used to follow good clinical practice and avoid over administration of the product.

As indicated above, one of the active compounds utilized in the process of the present invention is tetrahydrozoline. The preparation of this compound is described in copending patent application Serial No. 431,618, filed on May 21, 1954, by Martin E. Synerholm et al., which is a continuation-in-part of the earlier filed application Serial No. 361,819, filed on June 15, 1953 (and now abandoned). The application Ser. No. 431,618, issued January 17, 1956, as U.S. Patent 2,731,471. This compound is a base and may be prepared in the form of a variety of acid salts with organic or inorganic acids including hydrochloric acid, nitric acid, sulfuric acid, tartaric acid, citric acid, maleic acid, and so forth. Various related compounds may also be used. These include 2-(1-indanyl)-imidazoline and its acid addition salts.

As noted above, it has been found that an extremely small amount of one of the active materials may be utilized effectively in bringing about sedation of humans or certain other animals. In general, the amount required for sedation of an adult human ranges from about 0.5 to about 10.0 milligrams depending upon the individual and upon the depth of sedation required. A correspondingly smaller dosage should be utilized for younger persons. For instance, in infants, as little as 0.05 milligram has proven effectve. This represents the approximately minimum unit dosage of the active material.

In general, the active materials of the present invention may be administered in a variety of pharmaceutically useful vehicles, preferably in solid form. The compounds may be incorporated in capsules with various types of fillers and materials which insure an anhydrous stable composition. Tablets may be prepared with binders including various starches, synthetic and natural gums and other materials commonly used for the preparation of tabletted unit dosage forms.

The following examples are given by way of illustration and are not to be considered as the sole embodiment of this invention. It is to be understood that protection hereof is only limited by the specific wording of the appended claim.

Example I

Capsules of tetrahydrozoline hydrochloride were prepared as follows. One hundred milligrams of tetrahydrozoline, 470 grams of corn starch, and 9.9 grams of magnesium stearate were thoroughly blended for 30 minutes in a twin shell blender. The mixture was then passed through a ⅛ inch plate on a micropulverizer operating at 13,500 r.p.m. The mixture was reblended in the twin shell blender for one and one-half hours and it was then filled into No. 1 hard gelatin capsules. Each capsule contained 480 milligrams of the composition or 0.1 milligram of the active material.

The above preparation was repeated but utilizing tetrahydrozoline hydrochloride in a proportion sufficient to furnish 1.0, 0.25 and 0.5 milligram respectively in various lots of capsules. It was then found that these were highly effective in inducing sedation in humans.

Example II

A series of adult human patients were treated with one or more capsules of tetrahydrozoline hydrochloride prepared as in the previous example. The capsules used contained 0.1, 0.25, 0.5 and 1.0 milligram of the active agent respectively. It was found that two to three milligrams, that is, two or three of the one-milligram capsules were effective in inducing sleep within a period of 20 to 25 minutes in the majority of the adult patients. Others required a slightly higher dose or were not induced to sleep in such a short period.

What is claimed is:

A method of inducing sedation in an animal which comprises administering to said animal by the oral route a composition containing not less than 0.05 milligram of 2-(1,2,3,4-tetrahydro-1-naphthyl)-imidazoline.

(References on following page)

References Cited in the file of this patent

UNITED STATES PATENTS

| | | |
|---|---|---|
| 1,166,208 | Hoerlein | Dec. 28, 1915 |
| 2,731,471 | Synerholm et al. | Jan. 17, 1956 |

OTHER REFERENCES

Goodman et al.: "Pharmacol. Basis of Therapeutics," 2nd ed., 1955, Macmillan Co., N.Y., pp. 481–483, 522–523 and 534–536.

Howard: Modern Drug Encycl., 5th ed., 1949, Drug Publ., Inc., N.Y.C., pp. 787–788.